United States Patent [19]
Alfano et al.

[11] Patent Number: 5,636,050
[45] Date of Patent: Jun. 3, 1997

[54] APPARATUS USING OPTICAL DEFLECTION

[75] Inventors: Robert R. Alfano, Bronx; Ping-Pei Ho, Great Neck; Lina Yang, Scarsdale; Quan Z. Wang, New York, all of N.Y.

[73] Assignee: Research Foundation of City College of New York

[21] Appl. No.: 186,265

[22] Filed: Feb. 15, 1994

[51] Int. Cl.$^6$ ................................................ G02B 26/00
[52] U.S. Cl. ............................................................ 359/238
[58] Field of Search ........................... 359/299, 241, 359/244, 238, 239, 242, 243

[56] References Cited

U.S. PATENT DOCUMENTS

| | | |
|---|---|---|
| 4,956,548 | 9/1990 | Alfano et al. ............... 250/213 VT |
| 5,003,168 | 3/1991 | Alfano et al. ............... 250/213 VT |
| 5,126,874 | 6/1992 | Alfano et al. ............... 359/240 |
| 5,270,852 | 12/1993 | Tsuchiya et al. ............. 359/299 |
| 5,278,403 | 1/1994 | Alfano et al. ............... 250/214 VT |

OTHER PUBLICATIONS

Li et al., "Ultrafast all–optical deflection based on an induced area modulation in nonlinear materials," Optics Letters, vol. 16, No. 6 pp. 438–440 (Mar. 15, 1991).
Roehrenbeck, "Streak cameras measure high-speed optical pulses," Laser Focus World, pp. 169–171 (Nov. 1992).

*Primary Examiner*—Georgia Y. Epps
*Assistant Examiner*—Dawn-Marie Bey
*Attorney, Agent, or Firm*—Kriegsman & Kriegsman

[57] ABSTRACT

An optical streak camera includes an optical collimator, an all optical deflector, a detector and a display.

7 Claims, 7 Drawing Sheets

Time dependent optical index of refraction change.

APPARATUS USING OPTICAL DEFLECTION

BACKGROUND OF THE INVENTION

The present invention relates to an apparatus using optical deflection.

1. Yao Li, Dao Yang Chen, Lina Yang and Robert R. Alfano, Opt. Lett. 16, 438 (1991).
2. Robert R. Alfano, Yao Li, and P. Baldeck, U.S. Pat. No. 5,126,874 (1992).

As used herein the term "All Optical Streak Camera" refers to a streak camera for measuring an optical pulse without converting the optical pulse to a temporal electron signal.

Ultrashort laser pulses play an important role in ultrafast optical computing, optical signal processing, and optical communications. In these applications, the temporal profiles and the spectra of the ultrashort optical pulses usually carry the information to be investigated. One of the fundamental problems is to measure the temporal distribution of an optical pulse. Conventionally, an optical pulse is measured with a photomultiplier tube (PMT) or a streak camera. A PMT is a vacuum tube which converts an optical photon signal to an electron signal. The electron signal is processed. A streak camera is a time-to-space converter for optical pulses. The optical pulse to be measured is first convened to temporal electron signals. The electron signal is then converted into a spatial distribution hits a phosphor screen to produce a spatial fluorescence and detected by a two dimensional detector array. In the above methods, the optical pulses are all first converted into electron signal and then processed and analyzed. Hence, the speed of the measurements are significantly reduced. To increase the speed of the measurement, new methods of a direct quasi-all optical signal measurement are needed to digitize a signal.

It has been established that in a mutually perpendicular interaction geometry inside a nonlinear optical material, a probe pulse, which passes through an induced temporal prism formed by an area modulated optical pump pulse, undergoes a spatial modulation that leads to a beam deflection. This important observation can be utilized for a future generation of high speed optical pulse measurement and opto-electronic systems in the fields of optical computation and optical communications.

We disclose here all optical streak camera, all optical oscilloscope, optical signal processing, and optical A/D converters based on all optical deflection. An ultrafast all optical deflector has been disclosed in the past. A schematic diagram of an ultrafast all optical deflector is shown in FIG. 1. 13, 15, 17 and 19 denote the third-order nonlinear optical material, the strong pump beam, the weak signal beam, respectively. The device operates as follows: The strong pump and weak signal beams enter and overlap inside the nonlinear optical material in perpendicular directions. The P beam, before entering the NOM, is area modulated. As a simple example, the modulated area is taken as a triangle. The pump beam's optical power ($E^2$) is used to induce an index of refraction change $\Delta n = n_2 \langle E^2 \rangle$, where $n_2$ denotes the nonlinear index coefficient of the material. This induced refractive index change cause an induced transient prism of a modulated shape. In this case, the signal beam, as it passes through the induced prism, will undergo a direction change. An induced transient deflection occurs. The deflection angle $\gamma$ can be calculated to be $$\gamma = \frac{L \Delta n}{D} \quad (1)$$

where L and D are the triangle's base and height, respectively.

SUMMARY OF THE INVENTION

One embodiment of an apparatus using optical deflection according to this invention comprises an optical collimator, an all optical deflector, a detector and a display.

BRIEF DESCRIPTION OF THE DRAWINGS

In the drawings wherein like reference characters represent like parts.

DETAILED DESCRIPTION OF PREFERRED EMBODIMENTS

All Optical Streak Camera and All Optical Oscilloscope

Figure 1:
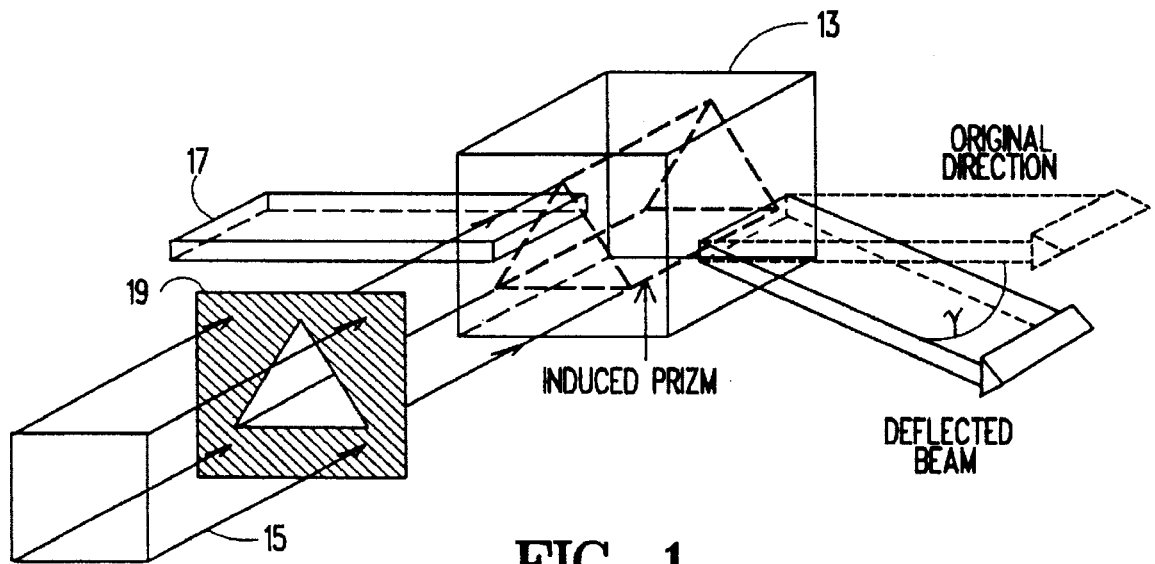
FIG. 1 is a schematic diagram of an ultrafast all optical deflector.
Figure 2:
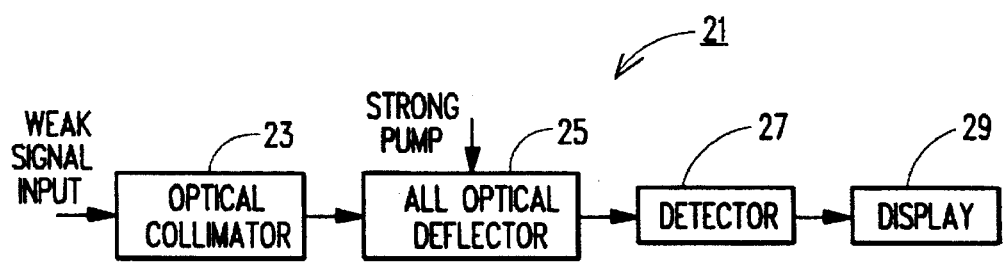
FIG. 2 is a block diagram of an all optical streak camera according to this invention.

Based on the induced optical deflection, a novel method of ultrafast optical pulse measurement using an all optical streak camera is proposed. The key point of an all optical streak camera is the deflection of a weak signal by the area modulation of a strong pump pulse induced time-dependent change of index of refraction. The block diagram of an all optical streak camera 21 is shown in FIG. 2. The all optical streak camera performs four major functions: (1) an optical collimator 23 collimating of the beam to be measured; (2) induced all optical deflector 25; (3) a detector 27 detection of the deflected beam, and (4) a display 29 for displaying a signal profile in space and converted to time.

Figure 3:
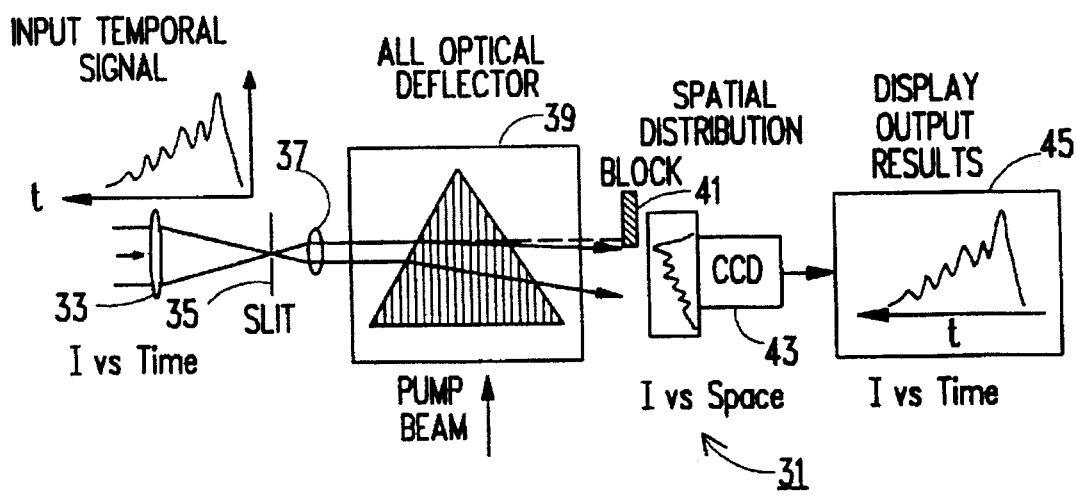
FIG. 3 is an example of an all optical streak camera corresponding to the block diagram shown in FIG. 2.

An example of an optical streak camera 31 is displayed in FIG. 3 and includes a focusing lens 33, a slit 35, a collimating lens 37, an all optical deflector 39, a block 41 detector 43 and a display 45.

(1) In this method, the resolution of the measurement will depend on the ratio of the deflected angle and the far field diffraction of the beam to be measured. Therefore, the collimation of the beam to be measured will be very important in the measurement.

(2) The heart of the all optical streak camera is the induced deflection of the beam to be measured. A strong pump pulse induces a time-dependent change of index of refraction. Different parts of the signal pulse will be deflected with different angle due to the time dependent change of index of refraction. Hence, the all optical deflector converts the temporal signal to spatial signal, just like conventional electro-optical streak camera. To obtain a linear temporal to spatial conversion, a linear index change, as shown in FIG. 4, in time is essential.

For the materials with nonlinear response much faster than the pulse duration of the pump pulse, the induced index change is transient. The temporal property of the induced index change has the same temporal function as the pulse shape itself. A triangle optical pulse (FIG. 4) is the ideal pulse to generate a linear index change in time in this case. For the materials with nonlinear response much slower than the pulse duration of the pump pulse, the temporal distribution of the index change is the convolution of the temporal pulse shape with the temporal response function of the nonlinear material. The nonlinear temporal response function of the material is needed to find out what type of pump pulses are ideal to generate linear index change in time.

Figure 4:
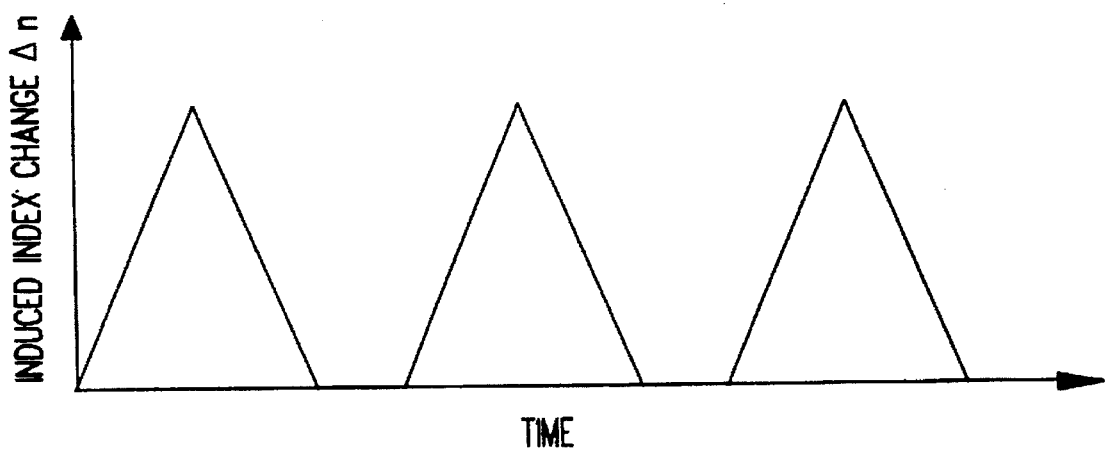
FIG. 4 is a graph of induced index change vs time for a triangularly shaped optical pulse.
Figure 5:
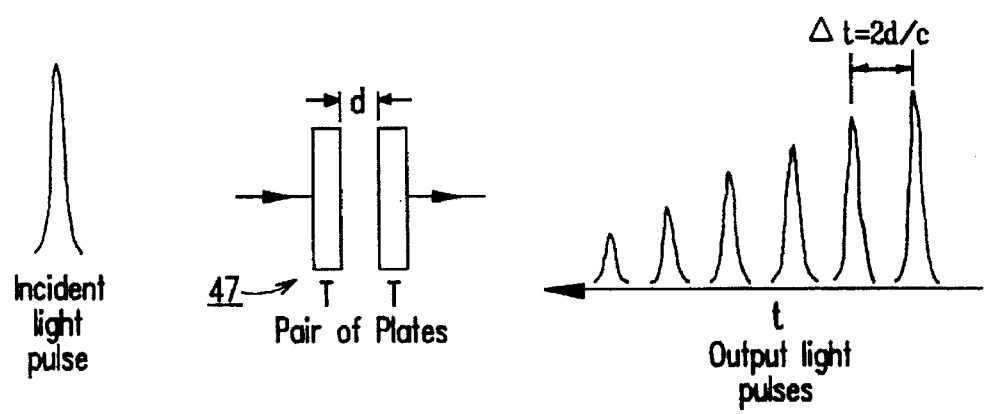
FIG. 5 is a diagram showing how tooth comb optical pulses can be generated from an incident light pulse.

A single optical pulse can be used to approximately generate linear index change in time as shown in FIG. 4. An alternate method is to use a pair of mirrored plates 47 to generate tooth comb optical pulses 49. FIG. 5 shows a schematic diagram of this method.

By passing an optical pulse through a pair of plates 47 with known spacing d, a series of exponentially decaying intensity pulses will emerge. The time separation between nearest two pulses is $\Delta t=2d/c$, where c is the velocity of light. The intensity profile of the emerging train is a decaying exponential with each subsequent peak reduced by $(1-T)^2$, where T is the coated transmission coefficients of the mirrors. For each round trip of the pulse between the mirrors, a light pule (K) of intensity $I_K=I_o(1-T)^{2K}$ is produced, where K=0, 1, 2, 3, ... n. Since $I_K/I_{K+1}$ equals $1/(1-T)^2$ equals constant, the envelope formed by the peaks of the pulses follows a single exponential decay in time as $$I=I_o\exp(-\Delta t/\ln(1-T)^2)$$

By adjusting the transmission coefficient T and the spacing between the two mirrors d, tooth comb optical pulses in time is obtained for produce the area gates for an all optical deflector.

Figure 6:
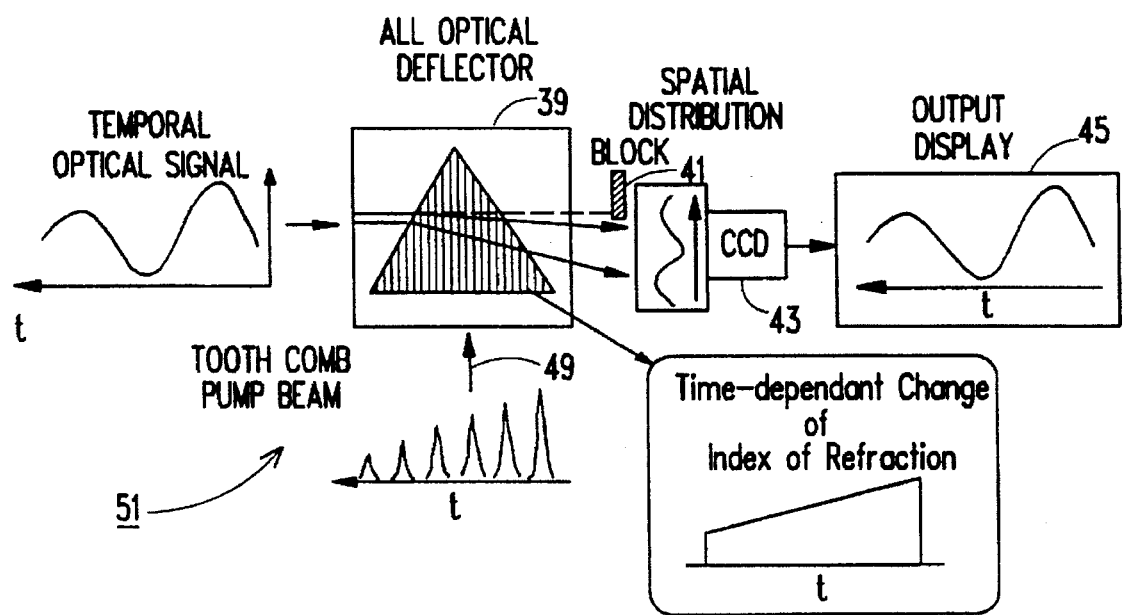
FIG. 6 is a diagram showing continuous deflection of a signal pulse by tooth comb pulses in a material having slow nonlinear response.

For materials having nonlinear response time slower than $\Delta t=2d/c$, a quasi-saw type of index of refraction change can be obtained. This kind of index of refraction change can be used to produce continuous deflection of a signal pulse, as shown in system 51 FIG. 6.

Figure 7:
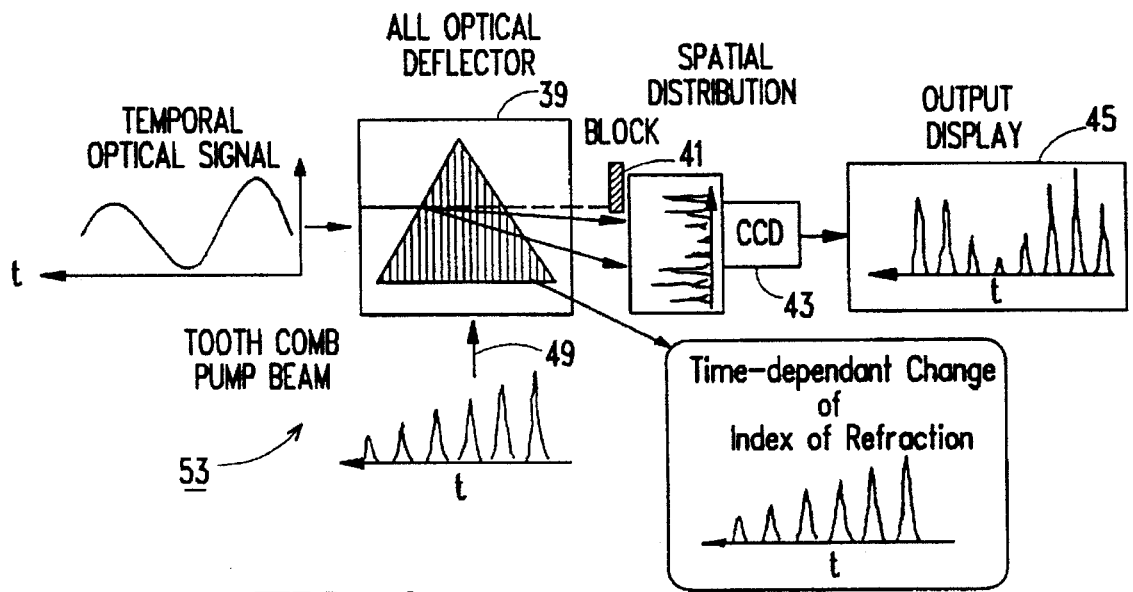
FIG. 7 is a diagram showing discrete deflection of a signal pulse by tooth comb pulses in a material having fast nonlinear response.

For materials having nonlinear response time faster than $\Delta t=2d/c$, tooth comb type of index of refraction change can be obtained. This kind of index of refraction change can be used to produce discrete deflection of a signal pulse, as shown in system 53 FIG. 7.

Figure 8:
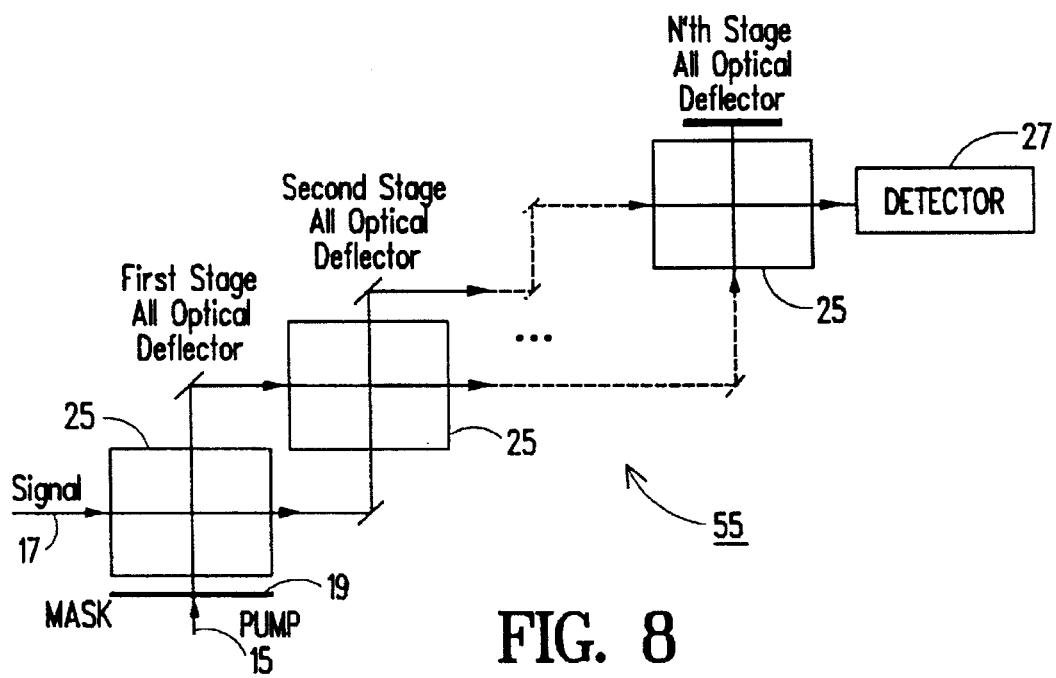
FIG. 8 is a diagram of a multi-stage optical deflector.

Multi-stage optical deflector can be applied to increase the deflection angle, as shown in system 55 FIG. 8.

In practice, the pump pulse shape may well be away from ideal ones. Calibration is necessary to compensate any nonlinear temporal-spatial conversion.

(3) The deflected beam can be detected with a 2-D CCD camera. The increase of the resolution of the detector will increase the resolution of the measurement of the optical pulses.

Figure 9:
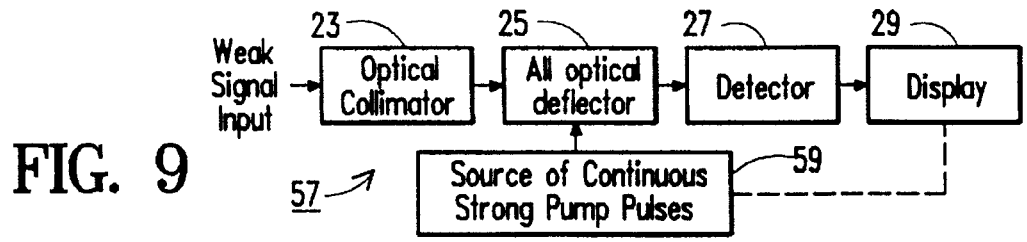
FIG. 9 is a block diagram of an all optical oscilloscope.

An all optical oscilloscope 57 is similar to the all optical streak camera described above, except that the display of an oscilloscope is continuous and the frequency of the display matches the frequency of the pump pulses from source 59. A block diagram for an all optical oscilloscope is displayed in FIG. 9.

Signal Processing and Optical A/D Converter

The above method can be also used for optical signal processing and optical A/D converters. If the information is carded by the optical pulse shape, one can digitize the deflected pulses by measuring the converted spatial distribution.

Figure 10:
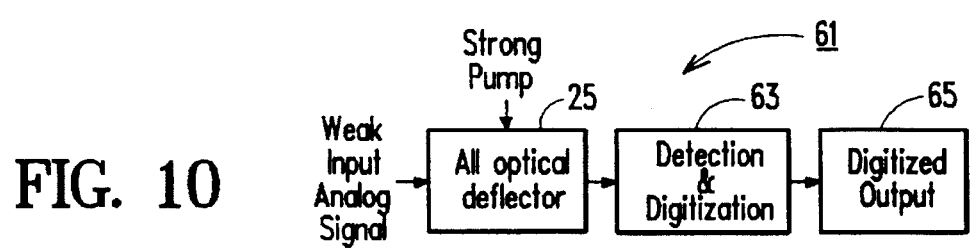
FIG. 10 is a block diagram of an optical A/D converter using an all optical deflector.

FIG. 10 displays a schematic diagram of optical A/D converter 61 using all optical deflector 25, a detection and digitizing unit 63 and a computer 65.

A strong pump pulse induces a time dependent change of index of refraction in the all optical deflector. The weak input temporal optical signal is converted into a spatial distribution by the all optical converter. The signal at different positions correspond to the signal at different times. The spatial signal is detected by a two dimensional CCD camera, or a cooled CCD camera, or an optical multichannel analyzer. The detected signals at different channels then can be digitized in parallel and sent to computer system for further analysis.

Since the temporal signal will be converted into spatial distribution and directly detected by detector, weak analog signals can be converted into digital forms using high sensitive detectors.

Figure 11:
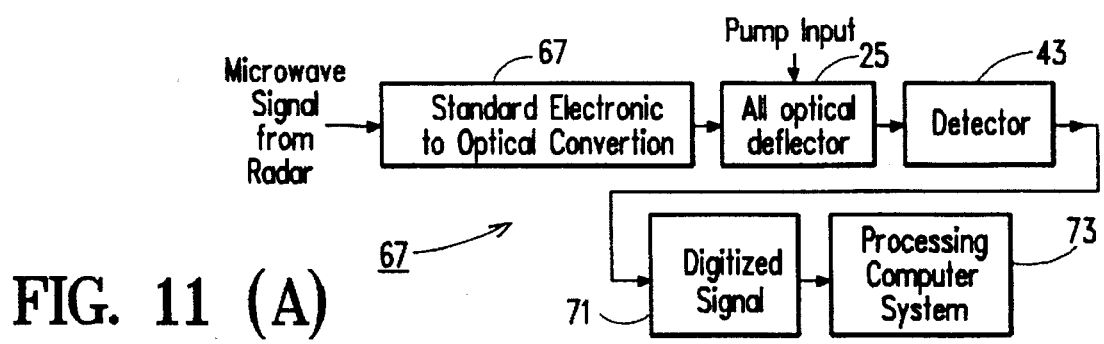
FIG. 11A is a block diagram of an application of an A/D converter using an all optical deflector.
FIG. 11B are diagrams of signal pulses and pump pulses.
Figure 11:
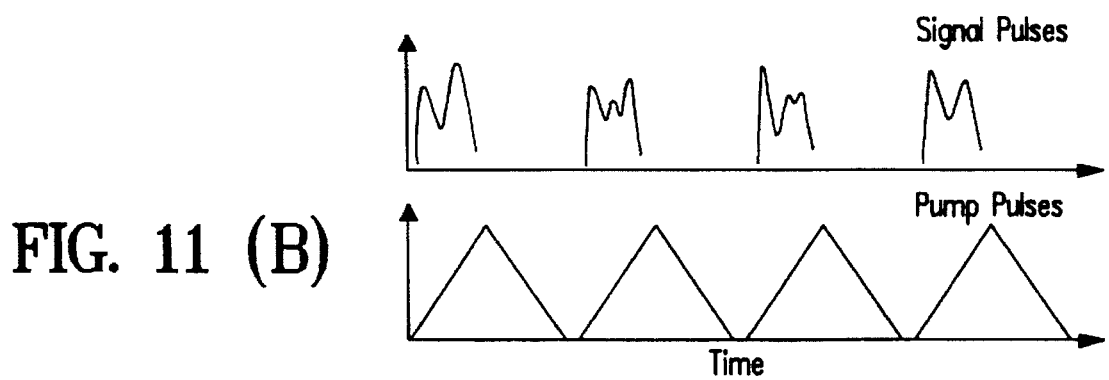

As an example of applications of this A/D converter, a block diagram system 67 of analog-to-digital conversion for the microwave signal from the antenna of a radar system using induced all optical deflection is displayed in FIG. 11. The microwave signal received by the antenna of a radar system is first converted into optical signal by conventional methods using a convertional converter 69. The optical signal is then directed through an all optical deflector 25 which convert a temporal optical signal to a spatial optical signal. The spatial signal is detected by a two dimensional detector 25 and digitized by a digitizer 71. The digitized signal then sent to computer system 73 for further processing.

Figure 12:
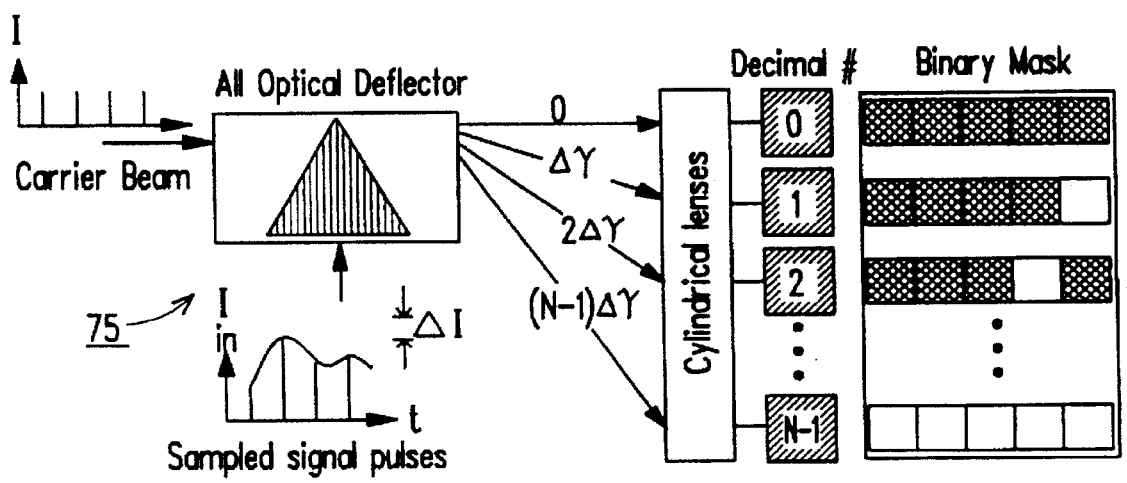
FIG. 12 is a diagram of an all optical A/D converter.
Figure 13:
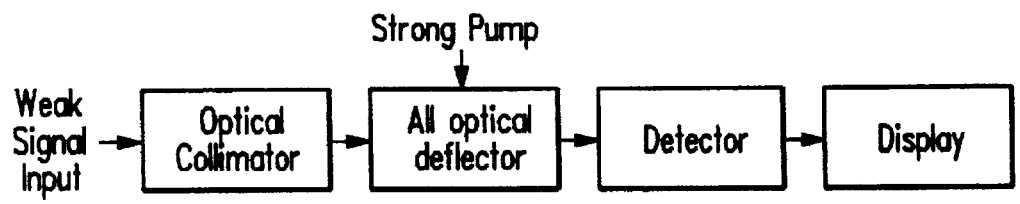
FIG. 13A is a block diagram of an ultrafast waveform digitizer.
FIG. 13B is a graph showing time dependent optical index of refraction change.
Figure 13:
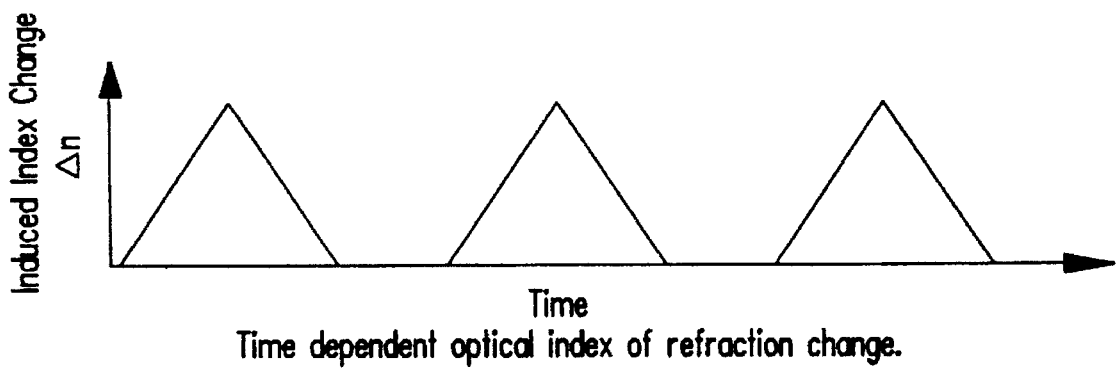
Figure 14:
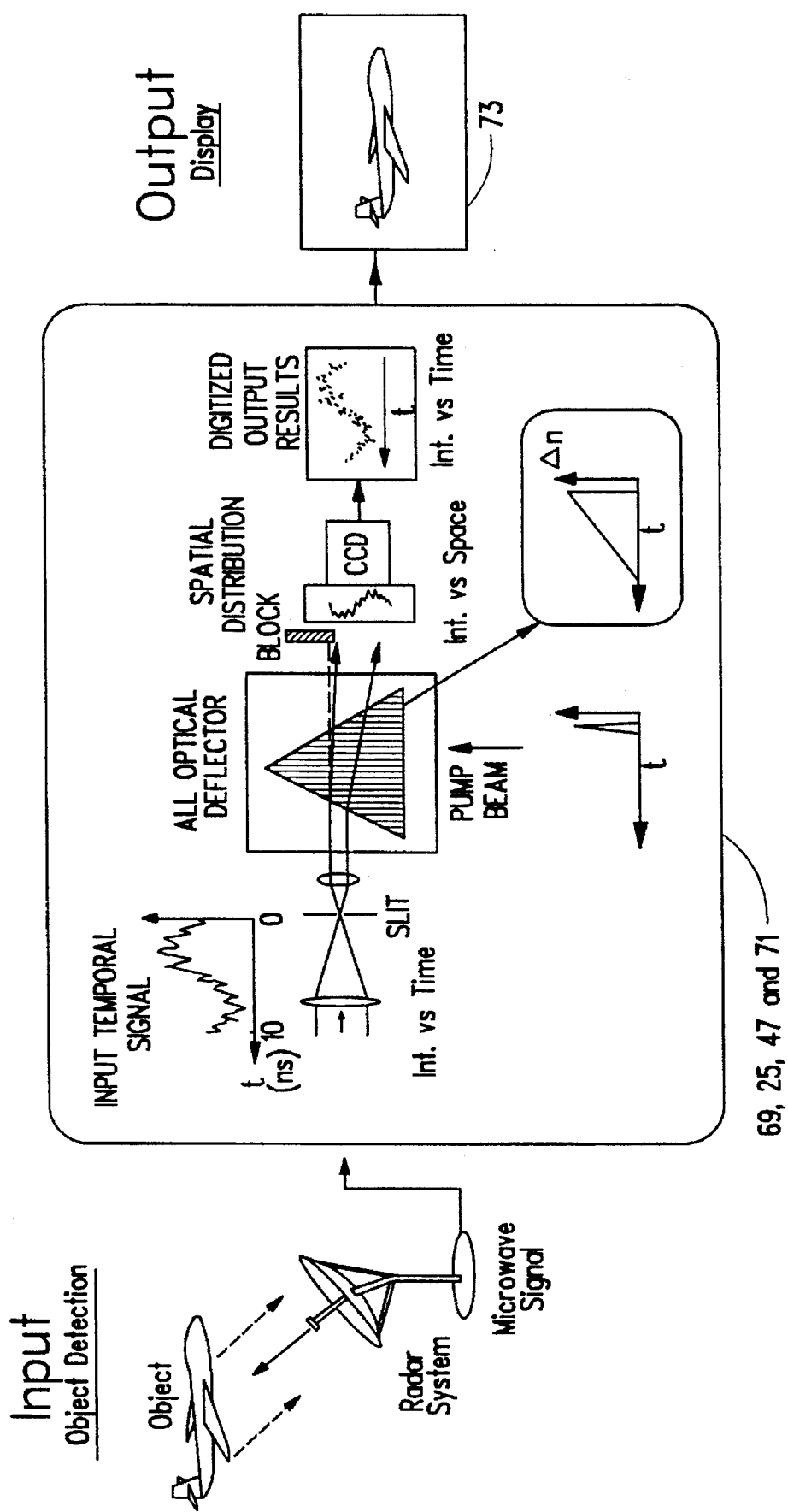
FIG. 14 is a diagram of a waveform digitization system.

Another type of ultrafast all optical analog to digital (A/D) converter is also proposed. The digitization is achieved by converting the intensity distribution of the analog signal beam into the spatial distribution of the carrier beam. The schematic diagram of an all optical deflector based A/D converter is shown in system 75 FIG. 12. The analog optical input signal is sampled first by an ultrafast optical sampler, such as an ultrafast optical Kerr gate amplitude modulator. In the A/D process, the sampled signal containing pulses with different intensities will be used as the pump beam for the deflector. The synchronized optical pulses with equal intensities will be used as the carrier (probe) beam. The device operates as follows.

Let's assume that $\Delta I$ is a designed intensity unit for the digitization, $\Delta \gamma$ is the corresponding unit value of the deflected angle and the linear relationship between the pump intensity and the correspondent deflected angle shown in Eq. (1) is valid within the pump intensity range. The deflected angles for the carrier beam are exaggerated in FIG. 12 for illustration. For those pump pulses having intensity $0 \leq I_{in} \leq \Delta I$, the output probe beam will be deflected at angle $\gamma$ with $0 \leq \gamma \leq \Delta\gamma$. A cylindrical lens can collimate the angular dispersed signal beams after the deflector, then those pump pulses can be digitized as number 0. When $\Delta I \leq I_{in} \leq 2\Delta I$, the output probe beam will be deflected at angle $\gamma$ with $\Delta\gamma \leq \gamma \leq 2\Delta\gamma$, those pump pulses are digitized as number 1. So on so fourth, when $(N-1)\Delta I \leq I_{in} \leq N\Delta I$, the output probe beam will be deflected at angle $\gamma$ with $(N-1)\Delta\gamma \leq \gamma \leq N\Delta\gamma$, and those pump pulses are digitized as number N-1. In this manner, analog intensity of $I_{in}$ can be digitized into coded decimal numbers from 0 to N-1 according to the intensity of the sampled analog signal.

A synthetic spatially variable absorption binary mask can be used on the probe beam to convert the above digitized decimal information into the binary format. Where the black area is presenting binary "0" and white area is for binary "1". Finally, an analog information is converted to digital information in binary format.

The converted digital information now can be transmitted to another place by coupling the digital beam into the optical fibers, or send to optical based circuits for computation.

Multi-stage all-optical deflectors can also be used in sequence to achieve desired deflection angles when the input analog signal is weak.

The following are some features of this invention considered novel:

1. All optical streak camera consists of optical collimator, all optical deflector(s), detector, and display unit.

2. All optical oscilloscope consists of optical collimator, all optical deflector(s), detector, and display unit.

3. All optical streak camera using time dependent index of refraction change.

4. All optical oscilloscope using time dependent index of refraction change.

5. Generation of optical tooth comb pulses as pump pulses for all optical deflector using a pair of plates or mirrors.

6. Ultrafast optical pulse measurement with 1 ns to 10 fs using induced optical deflection.

7. Ultrafast optical pulse measurement with 1 ns to 10 fs using ultrafast nonlinear response materials to induced optical deflection.

8. Ultrafast optical measurement with 1 ns to 10 fs using slow nonlinear response materials to induced optical deflection.

9. Ultrafast optical pulse measurement with 1 ns to 10 fs using ultrafast nonlinear response materials and multi-stage induced optical deflection to induced optical deflection.

10. Ultrafast optical pulse measurement with 1 ns to 10 fs using slow nonlinear response material and multi-stage induced optical deflection to induced optical deflection.

11. Using optical multi-channel analyzer, CCD camera, cooled CCD camera to detect the spatial distribution of the optical signals for all optical streak camera.

12. Optical signal A/D converter using all optical deflection.

13. Optical signal A/D converter using ultrafast (ps to fs) nonlinear response materials to induced optical deflection.

14. Optical signal A/D converter using slow (100 ns to 100 ps) nonlinear response materials such as polymers, liquid crystals, and liquids to induced optical deflection.

15. Optical signal A/D converter using ultrafast nonlinear response materials and multi-stage (2 to 100) induced optical deflection to induced optical deflection.

16. Optical signal A/D converter using slow nonlinear response material and multi-stage induced optical deflection to induced optical deflection.

17. Using optical multi-channel analyzer, CCD camera, cooled CCD camera to detect the spatial distribution of the optical signals, convert into parallel digital form and store in computer for processing.

What is claimed is:

1. An optical streak camera for measuring an input temporal signal beam of light, said optical streak camera comprising:

a. means for collimating said input temporal signal beam of light to be measured, b. a first all optical deflector for receiving the collimated input temporal signal and converting the input temporal signal beam of light into a spatial signal beam of light, wherein the first all optical deflector comprises a body of nonlinear optical material and an area modulated, time-dependent, intensity-modulated pump beam of light for producing a time-dependent induced refractive index change in the body of nonlinear material, said induced refractive index change causing a sweeping of said collimated input temporal signal beam of light, c. a detector for detecting the spatial signal beam of light, and d. a display for displaying the spatial signal beam of light.

2. The optical streak camera of claim 1 wherein said area modulated pump beam of light is shaped to include at least one triangular pulse.

3. The optical streak camera of claim 1 wherein said area modulated pump beam comprises tooth comb shaped optical pulses.

4. The optical streak camera of claim 1 and further including a second all optical deflector in series with the first all optical deflector.

5. The optical streak camera of claim 1 wherein the optical nonlinear material has a response time faster than the pulse duration of the pump pulse.

6. The optical streak camera of claim 1 wherein the optical nonlinear material has a response time slower than the pulse duration of the pump pulse.

7. An optical streak camera for displaying an input temporal signal beam of light, said optical streak camera comprising:

a. means for collimating said input temporal signal beam of light to be measured, b. a first all optical deflector for receiving the collimated input temporal signal beam and sweeping the input temporal signal beam of light into a spatial signal beam of light, said all optical deflector including a non-linear material and a beam of continuous pump pulses, the intensity of said continuous pump pulses being modulated over time to vary the index of refraction of the non-linear material to enable sweeping, c. a detector for detecting the spatial signal beam of light, and d. a display for displaying the spatial signal beam of light, e. the frequency of the display matching the frequency of the pump pulses.

* * * * *